United States Patent
Hwang et al.

(10) Patent No.: US 8,457,611 B2
(45) Date of Patent: Jun. 4, 2013

(54) AUDIO FILE EDIT METHOD AND APPARATUS FOR MOBILE TERMINAL

(75) Inventors: Yong Duk Hwang, Daegu Metropolitan (KR); Sung Hm Yun, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 914 days.

(21) Appl. No.: 12/552,532

(22) Filed: Sep. 2, 2009

(65) Prior Publication Data

US 2010/0056128 A1 Mar. 4, 2010

(30) Foreign Application Priority Data

Sep. 4, 2008 (KR) .................. 10-2008-0087284

(51) Int. Cl.
*H04L 29/08* (2006.01)

(52) U.S. Cl.
USPC .................. 455/414.4; 455/412.1; 455/414.1; 455/556.1; 455/566; 455/567; 455/90.1; 707/803; 707/805

(58) Field of Classification Search
USPC .................. 455/556.1, 556.2, 563, 566, 567, 455/90.1, 412.1, 414.1, 414.4; 348/14.03; 707/802–809, 999.101, 999.102
See application file for complete search history.

(56) References Cited

U.S. PATENT DOCUMENTS

| | | | | |
|---|---|---|---|---|
| 7,295,864 B2 * | 11/2007 | Shanahan | ...... | 455/567 |
| 2004/0204135 A1 * | 10/2004 | Zhao et al. | ...... | 455/566 |
| 2006/0040703 A1 * | 2/2006 | Lai et al. | ...... | 455/556.1 |
| 2007/0083674 A1 * | 4/2007 | Mulder et al. | ...... | 709/246 |
| 2008/0301169 A1 * | 12/2008 | Hagihara | ...... | 707/102 |

FOREIGN PATENT DOCUMENTS

| | | | |
|---|---|---|---|
| EP | 0 877 378 | * | 11/1998 |
| KR | 10-0664677 B1 | | 12/2006 |
| KR | 10-0675404 B1 | | 1/2007 |

* cited by examiner

*Primary Examiner* — Tuan A Tran
(74) *Attorney, Agent, or Firm* — Jefferson IP Law, LLP

(57) ABSTRACT

A file edit method and apparatus that allows editing and utilizing various audio files stored in the mobile terminal in an intuitive manner are provided. An audio file edit method for a mobile terminal includes executing an audio file edit application in response to a touch event detected on a touch screen, selecting at least one audio file to be edited by means of the audio file edit application in response to a touch event detected on the touch screen, displaying an oscillation graph representing the at least one audio file within an oscillation window, selecting a part of the oscillation graph in response to a touch event detected on the touch screen, and displaying the selected part of the oscillation graph within an edit window.

20 Claims, 6 Drawing Sheets

AUDIO FILE EDIT METHOD AND APPARATUS FOR MOBILE TERMINAL

PRIORITY

This application claims the benefit under 35 U.S.C. §119(a) of a Korean patent application filed in the Korean Intellectual Property Office on Sep. 4, 2008 and assigned Serial No. 10-2008-0087284, the entire disclosure of which is hereby incorporated by reference.

BACKGROUND OF THE INVENTION

1. Field of the Invention

The present invention relates to a mobile terminal. More particularly, the present invention relates to an audio file edit method and apparatus for editing and utilizing various audio files stored in the mobile terminal in a simple and convenient manner.

2. Description of the Related Art

Recently, the use of mobile terminals has become widespread and the number of users is increasing rapidly. More particularly, the mobile terminals (e.g. mobile phone) have become an essential item carried by a majority of people for making and receiving calls while they are on the move. Recent mobile communication terminals now include various supplementary functions as well as the voice communication function. For instance, a mobile communication terminal now integrates supplementary functions such as an MP3 player for playing audio files having an MP3 file format, a digital camera for taking and editing pictures, and a game function for playing mobile games.

With the integration of these various supplementary functions, the conventional mobile terminals have been developed to include increased data storage capacity and playback performance. However, they remain limited in their ability to edit data for other purposes.

SUMMARY OF THE INVENTION

An aspect of the present invention is to address at least the above-mentioned problems and/or disadvantages and to provide at least the advantages described below. Accordingly, an aspect of the present invention is to provide a file edit method and apparatus for a mobile terminal that is capable of editing various files stored in the mobile terminal according to the user's intention.

In accordance with an aspect of the present invention, an audio file edit method for a mobile terminal is provided. The method includes executing an audio file edit application in response to a touch event detected on a touch screen, selecting at least one audio file to be edited by means of the audio file edit application in response to a touch event detected on the touch screen, displaying an oscillation graph representing the at least one audio file within an oscillation window, selecting a part of the oscillation graph in response to a touch event detected on the touch screen, and displaying the selected part of the oscillation graph within an edit window.

In accordance with another aspect of the present invention, an audio file edit apparatus for a mobile terminal is provided. The apparatus includes a display unit for displaying an audio file edit application screen according to the execution of an audio file edit application, a storage unit for storing the audio file edit application and audio files, a touch screen for generating a command for editing the audio files in response to a touch event input by a user, and a control unit for controlling to display an oscillation graph representing an audio file selected in response to a touch event, for selecting a part of the oscillation graph in response to a touch event, and for displaying the selected part of the oscillation graph in response to a touch event.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
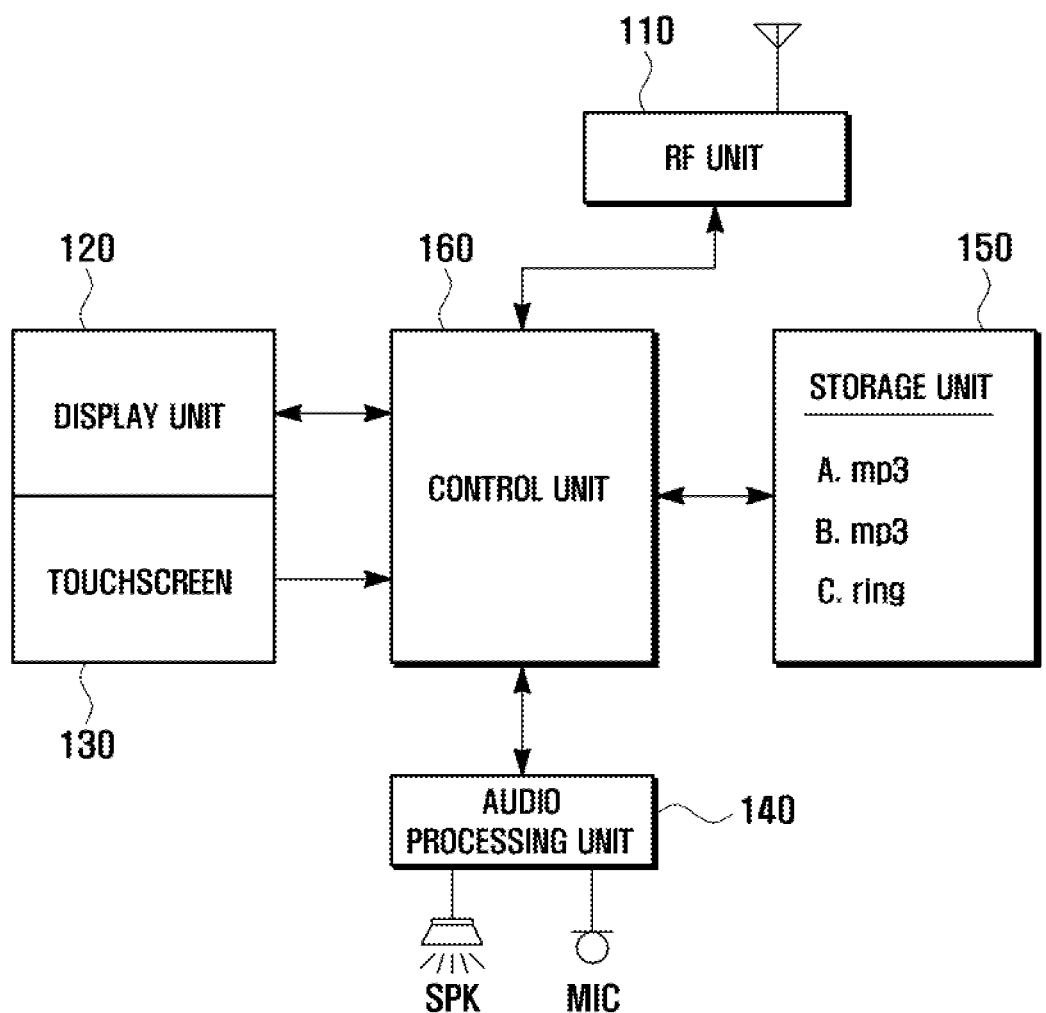
FIG. 1 is a schematic block diagram illustrating a mobile terminal according to an exemplary embodiment of the present invention.

Referring to FIG. 1, the mobile terminal includes a Radio Frequency (RF) unit 110, a display unit 120, a touch screen 130, an audio processing unit 140, a storage unit 150, and a control unit 160.

The mobile terminal can be configured to display a file stored in the storage unit 150 or received by means of the RF unit 110 on the display unit 120 with a file edit tool application. The file edit tool application enables editing of the file by using the touch screen 130, which is assembled on the display unit 120. As an example, if an MP3 file is edited with the file edit tool application, the edited file can be set as a ringtone of the mobile terminal such that, when an incoming call is received, the audio processing unit 140 processes the edited file to output in the form of a sound wave. The internal function blocks of the mobile terminal are described hereinafter in more detail.

The RF unit 110 is responsible for transmitting and receiving radio signals carrying data for voice and video communications. Typically, the RF unit 110 includes an RF transmitter for up-converting and amplifying the transmission signal frequency and an RF receiver for low noise amplifying and down-converting the received signal frequency.

More particularly, in an exemplary embodiment of the present invention, the RF unit 110 delivers an incoming call request signal to the control unit 160 and in response the control unit 160 controls such that the edited file corresponding to a ringtone set for the caller is played in response to the incoming call request signal. The RF unit 110 also can establish a communication channel with a base station in response to a user request through which the mobile terminal accesses a web server and communicates with other terminals.

The display unit 120 displays an operation status of the mobile terminal. For instance, the display unit 120 displays a booting progress screen, an idle mode screen, a call progress screen and the like. The display unit 120 can be implemented with a Liquid Crystal Display (LCD). In this case, the display unit 120 can include an LCD controller, a video memory for buffering video data and LCD devices. Moreover, the display unit 120 can work as an input device in cooperation with the touch screen 130.

More particularly, in an exemplary embodiment of the present invention, the display unit 120 can display an audio file edit application screen in which at least one image object is presented and moved in response to a command input by using the touch screen 130. The visual interface of the display unit 120 is described later in more detail with reference to the drawings.

The touch screen 130 can be disposed at one side of the display unit 120 or over the front of the mobile terminal as an input device. For this purpose, the touch screen 130 is configured with plural sets of input keys and function keys mapped to the coordinates to receive alphanumeric data and commands input by the user. The touch screen 130 sends a signal corresponding to a touch event detected on the touch screen to the control unit 160. The function keys include the navigation keys and shortcut keys. The touch screen 130 can be configured to output the key signals related to the user settings and function controls to the control unit 160. More particularly, in an exemplary embodiment of the present invention, the touch screen 130 can be implemented to cover the entire display zone. The touch screen 130 generates a signal corresponding to a touch event (such as a tap event for selecting a specific file stored in the storage unit 150, a drag event for dragging the selected file, and other edit-related events) and outputs the signal to the control unit 160. In an exemplary implementation, the touch screen 130 sends the control unit 160 a coordinate at the position where a contact is detected such that, when a touch event occurs at the coordinate, the control unit 160 executes a command link to the image.

The audio processing unit 140 is provided with a speaker (SPK) for outputting audio data generated during a voice call and a microphone (MIC) for receiving audio signals including a user's voice. More particularly, in an exemplary embodiment of the present invention, when an edited file is set for the ringtone, the audio processing unit 140 processes the edited file to be output in the form of a sound wave under the control of the control unit 160.

The storage unit 150 stores application programs required for achieving the functions and operations related to the file edit method (such as an audio file edit application program and a ringtone application program for setting an edit file as the ringtone of the mobile terminal and files to be edited and edited already). The storage unit 150 can be responsible for buffering the files in the middle of the file edit process. In an exemplary implementation, the storage unit 150 is divided into a program region and a data region.

The program region may store an Operating System (OS) for booting up the mobile terminal, a radio control application program for controlling the RF unit 110, an audio file edit application program for editing files stored in the storage unit 150, and a touch screen control application program for controlling operations of the touch screen 130. The program region may also store applications required for running the optional functions (such as audio playback and still and motion picture playback) of the mobile terminal. When the audio file edit application program is loaded in response to the user request, the control unit controls such that the application screen of the audio file edit application program is displayed by means of the display unit 120. The file edit process using the audio file edit application is described later in more detail with reference to the related drawings.

The data region may store contents or user data related to the supplementary options of the mobile terminal and applications such as motion picture data, phonebook data, audio data and the like. More particularly, in an exemplary embodiment of the present invention, the data region may store the source audio files supported by the mobile terminal (e.g. A.mp3 and B.mp3) and the edited audio file (e.g. C.ring) acquired by editing the source audio files by means of the audio file edit application.

The control unit 160 controls the power supply to the internal function blocks and signaling among the internal function blocks of the mobile terminal. More particularly, in an exemplary embodiment of the present invention, the control unit 160 controls the execution of the audio file edit application program, a file editing process using the audio file edit application program, and the setting of the edited file as the ringtone of the mobile terminal in response to a series of user commands.

As described above, the mobile terminal according to an exemplary embodiment of the present invention is configured to edit the files stored in the storage unit 150 or received from outside by means of the RF unit 110 with a full application screen of the audio file edit application, thereby facilitating file editing. Also, the file edit apparatus according to an exemplary embodiment of the present invention allows setting the edited file as the ringtone of the mobile terminal, whereby the user can customize the ringtone of the mobile terminal to his/her taste.

Figure 2:
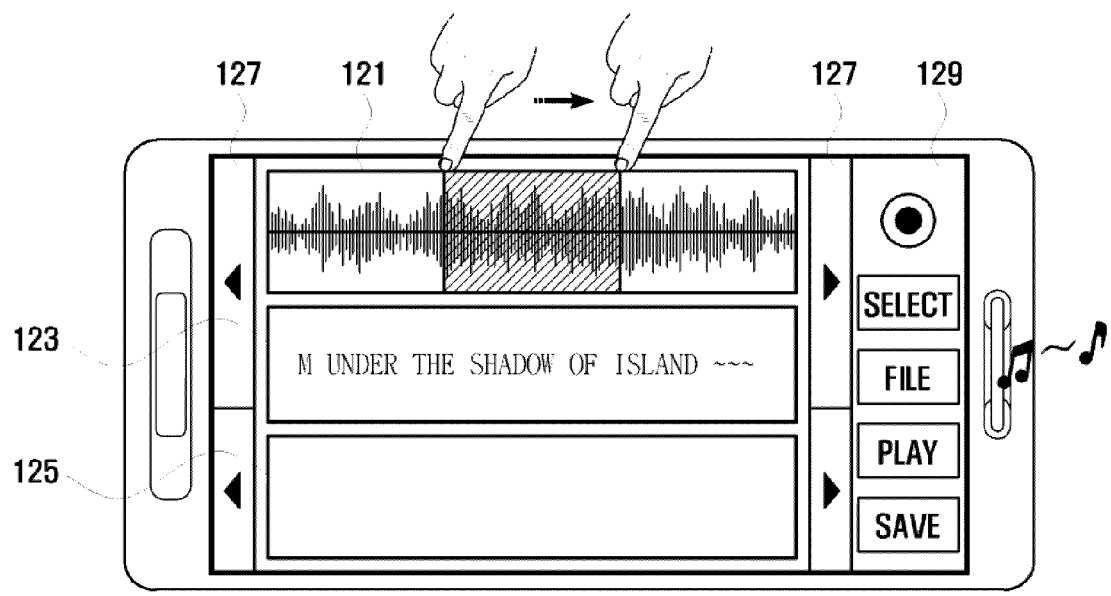
FIG. 2 is an exemplary diagram illustrating a step of selecting a part of an audio file in an audio file edit application screen of the mobile terminal of FIG. 1 according to an exemplary embodiment of the present invention.
Figure 3:
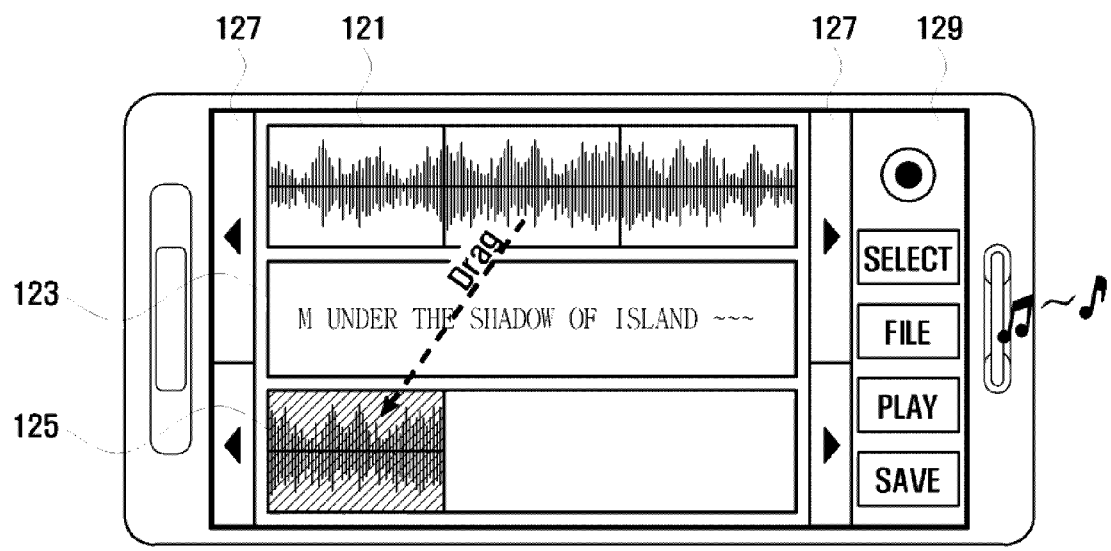
FIG. 3 is a step cropping the selected part of the audio file in the audio file edit application screen of FIG. 2 according to an exemplary embodiment of the present invention.

FIG. 2 illustrates a step of selecting a part of an audio file in an audio file edit application screen according to an exemplary embodiment of the present invention, and FIG. 3 illustrates a step of cropping the selected part of the audio file in the audio file edit application screen of FIG. 2, according to an exemplary embodiment of the present invention.

Referring to FIG. 2, once the audio file edit application is executed in the mobile terminal, the display unit 120 of the mobile terminal displays an audio file edit application screen. The audio file edit application screen is composed of a first oscillation window 121, a text window 123, an edit window 125, a pair of navigation buttons 127, and a menu bar 129. Before beginning the explanation, it is assumed that the audio file edit application is executed in response to a user selection of an audio file edit application on a menu screen of the mobile terminal.

The first oscillation window 121 is activated when one of the audio files stored in the storage unit 150 is selected. The first oscillation window 131 shows the information on the selected audio file. For example, the first oscillation window 121 can be configured to display a part of the waveform of the audio file since the audio file is likely to be too long to display in the display screen which is limited in size. At this time, the audio file can be displayed in the form of an oscillation graph in the first oscillation window 121. That is, the first oscillation window 121 can display the audio information contained in the audio file in the form of the tone pitches or frequency pitches.

The text window 123 displays a song lyric (i.e. text) contained in the audio file. For this purpose, the control unit 160 analyzes the information contained in the audio file and extracts the oscillation information of tone pitches and text information from the audio file. The control unit 160 also controls such that the extracted oscillation information is displayed within the first oscillation window 121 and the text information is displayed within the text window 123. At this time, the control unit 160 synchronizes the oscillation information displayed in the first oscillation window 121 and the text information displayed in the text window 123 to match a specific text with a specific part of the oscillation information.

In case that the audio file does not contain any text information, the control unit 160 can play the audio file in a background processing mode to collect the text information. That is, the control unit 160 executes a speech recognition function while playing the audio file in the background processing mode and converts the recognized speech into text. The converted text can be stored in the storage unit 150 and/or displayed within the text window 123 under the control of the control unit 160. During the speech recognition process, the control unit 160 marks times to the converted text such that the text is displayed within the text window 123 in synchronization with the oscillation information within the oscillation window. In order to perform the speech recognition function, the mobile terminal provides a speech recognition database and a speech recognition algorithm within the storage unit 150. The mobile terminal also can be configured to transmit the audio file (or information on the audio file) to a server by means of the RF unit 110 for requesting the server to send a text (i.e. a song lyric) corresponding to the audio file. Once the text is received from the server, the control unit 160 displays the text within the text window 123.

The edit window 125 is a window for displaying an audio clip cropped from the first oscillation window 121. The audio clip cropped from the first oscillation window 121 is also displayed in the form of an oscillation graph within the edit window 125. The oscillation graph displayed in the edit window 125 can be a copy of the part selected from the oscillation graph displayed within the first oscillation window 121.

The navigation buttons 127 are used to navigate a pointer on the first oscillation window 121, text window 123, and edit window 125. Although the first oscillation window 121 shows a part of the entire oscillation graph of the audio file, the oscillation graph can be scrolled left and right by using the navigation buttons 127. The user can navigate to the left and right to see the parts of the oscillation graph that are not currently displayed in the first oscillation window 121 by touching one of the navigation buttons 127 in the form of a short or a long key stroke. For instance, if the left navigation button 127 has been clicked, then the oscillation graph is scrolled to the right such that the preceding part of the oscillation graph is placed within the first oscillation window 121. Otherwise, if the right navigation button 127 has been clicked, then the oscillation graph is scrolled to the left such that the following part of the oscillation graph is placed within the first oscillation window 121. The navigation buttons may also be configured to support a long key stroke function such that, if the user maintains a touch on the navigation button, the oscillation graph is scrolled until the touch is released. In an exemplary embodiment of the present invention, the touch screen 130 can sense the strength and/or duration of the touch detected on the navigation buttons, such that the control unit 160 controls the scrolling speed of the oscillation graph according to the strength of the touch. For example, the greater the touch strength detected on the navigation button 127 is, the faster the oscillation graph is scrolled. In an exemplary embodiment of the present invention, the text displayed within the text window 123 is scrolled in synchronization with the oscillation graph.

The menu bar 129 is provided with a plurality of menu buttons for editing the audio file displayed within the first oscillation window 121. For example, the menu bar 129 may include a "file" button for importing an audio file stored in the storage unit 150, a "select" button for selecting a part of the oscillation graph of the audio file by designating a start point and an end point on the timeline using the pointer, a "play" button for playing the selected part of the oscillation graph, a "save" button for saving the audio clip displayed in the edit window 125 in the storage unit 150 and the like. The menu bar 129 may include further function menu buttons such as a "color" button for selecting the color of the oscillation graph, a "zoom-in" button for zooming in the selected part of the oscillation graph and the like.

In an exemplary embodiment of the present invention, if the "file" button of the menu bar 120 is touched by the user, the audio file edit application displays a list of audio files stored in the storage unit 150. The audio file list can be displayed in the form of a popup window. If a specific file is selected from the audio file list, the audio file edit application displays the selected audio file within the first oscillation window 121 in the form of an oscillation graph. At this time, the text window 123 displays a text that is stored in the storage unit 150 together with the audio file or received from a web server. In another exemplary embodiment, if the "file" button of the menu bar 120 is touched by the user, the audio file edit application may include a prompt which allows the user to select and receive an audio from an external source using the RF unit 110. If the "selection" button is touched after loading the audio file, the audio file edit application selects a part of the oscillation graph in response to the touch event. For instance, if the user has selected a part of the oscillation graph corresponding to the text "shadow of island" by sliding a touch point along the first oscillation window, the audio file edit application controls the audio processing unit 140 to output the selected part of the audio file through the speaker (SPK) in the form of a sound wave. The selection of a part of the oscillation graph can be done by touching a point and dragging the touch along the timeline or by touching two points on the time line. At this time, the text window 123 can be highlighted at a part corresponding to the selected part of the oscillation graph. That is, the part of the text window 123 corresponding to the selected part of the first oscillation window 121 is changed, for example it is inverted in color or marked with a specific mark to indicate the selection. When a specific point on the timeline is touched, the control unit 160 can control such that the tone at the touch point on the timeline is output through the speaker (SPK).

Referring to FIG. 3, the selected part of the oscillation graph within the first oscillation window 121 can be dragged and dropped into the edit window 125. When the selected part of the oscillation graph is moved to the edit window 125, the corresponding text can be moved together with the selected part. In this case, the corresponding text can be displayed overlapping on the oscillation graph within the edit window 125 or at a space below the edit window 125. If the "play" button is touched after copying the selected part of the oscillation graph to the edit window 125, the control unit 160 controls the audio processing unit 140 to process the audio file to output the selected part through the speaker (SPK). If the "save" button of the menu bar 129 is touched after the selected part has been confirmed as an edited file, the control unit 160 saves the edited file within the storage unit 150. In more detail, the control unit 160 may output a "save as" popup window having a text input box in response to the selection of the "save" button such that the user can save the edited file with a new file name. The "save as" popup window can be output with a separate text input window for receiving the name of the edited file. In an exemplary embodiment of the present invention, a pair of the navigation buttons 127 are provided at left and right sides of the oscillation window 121 such that the user can scroll the oscillation graph along the timeline to select an appropriate part while navigating the entire audio file.

FIGS. 4A to 4E are exemplary diagrams illustrating steps of editing an audio file in an audio file edit application screen according to an exemplary embodiment of the present invention.

Figure 4A:
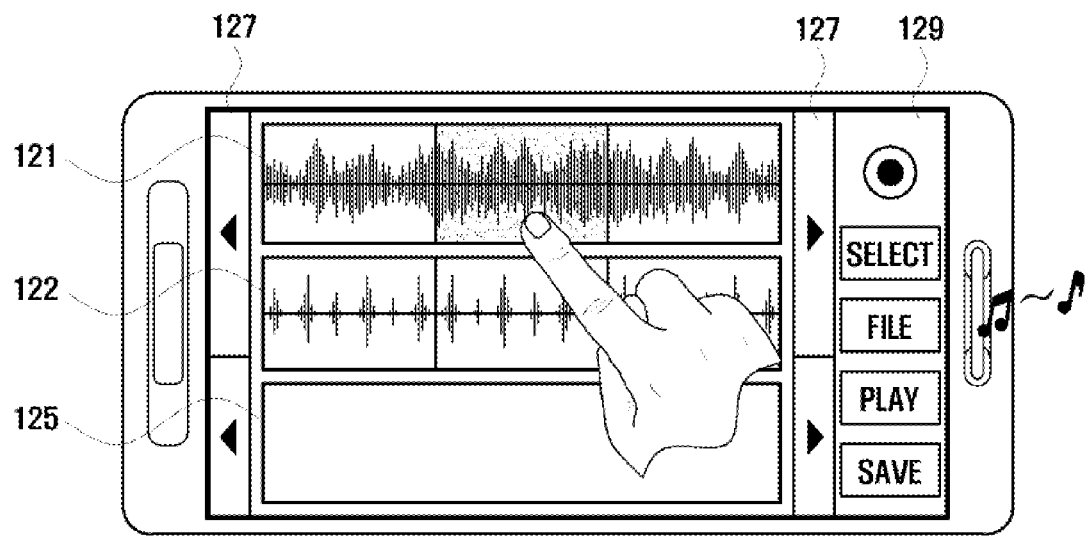
FIGS. 4A to 4E are exemplary diagrams illustrating steps of editing an audio file in an audio file edit application screen according to another exemplary embodiment of the present invention.

Referring to FIG. 4A, the audio file editing application screen is illustrated when two audio files are loaded. In this case, the audio file editing application screen includes a first oscillation window 121, a second oscillation window 122, an edit window 125, a pair of navigation buttons 127, and a menu bar 129. The user can crop at least one part of the first oscillation graph displayed in the first oscillation window 121 and the second oscillation graph displayed in the second oscillation window 122 and mix the cropped parts. For instance, if the user first selects an audio file A.mp3, the control unit 160 loads the audio file and displays the oscillation graph of the A.mp3 in the first oscillation window 121. Next, the user touches the "file" button to see the audio file list and, if another audio file is selected from the audio file list, the control unit 160 loads the second audio file as the second audio file and displays the oscillation graph of the B.mp3 in the second oscillation window 122. After the oscillation graphs of the files A.mp3 and B.mp3 are displayed in the respective first and second oscillation windows 121 and 122, the user can select a part of either the first or second displayed oscillation graphs and drag the selected part to the edit window 125 as a first partial oscillation graph. When the user selects the part as the first source oscillation graph, the control unit 160 can control such that the audio data corresponding to the first source oscillation graph is processed to be output in the form of an audible sound wave.

Figure 4B:
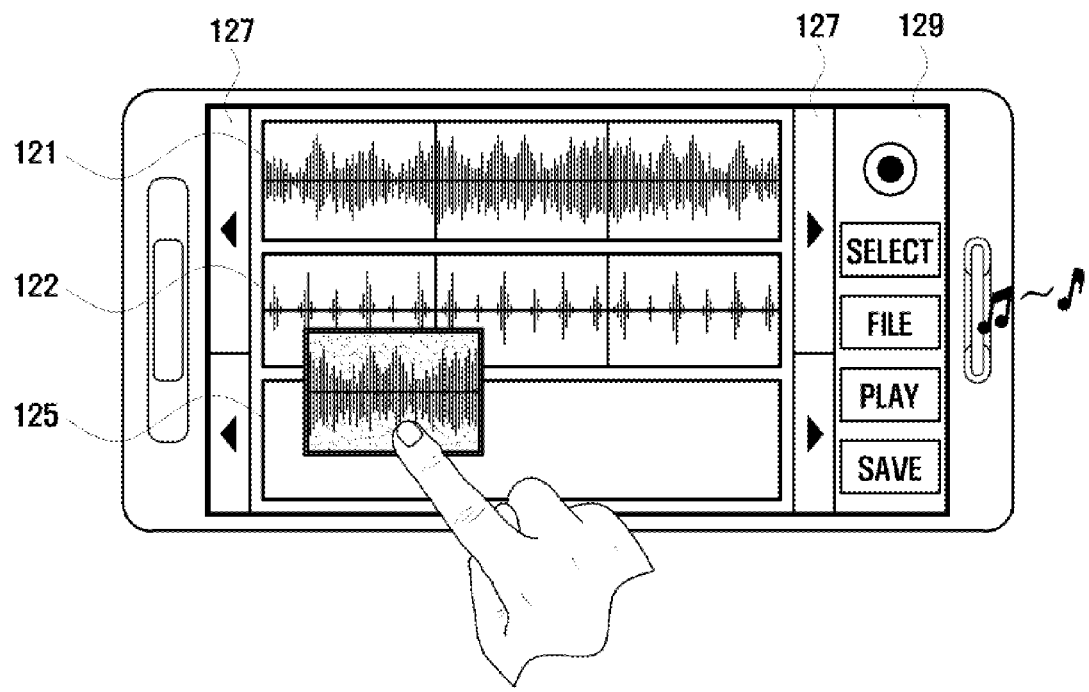
Figure 4C:
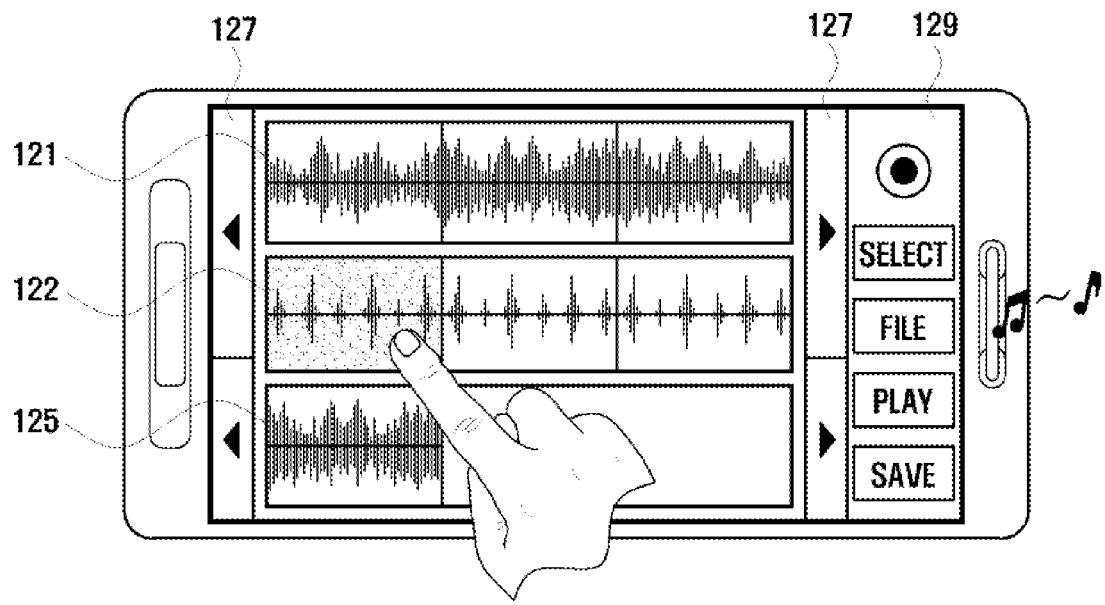
Figure 4D:
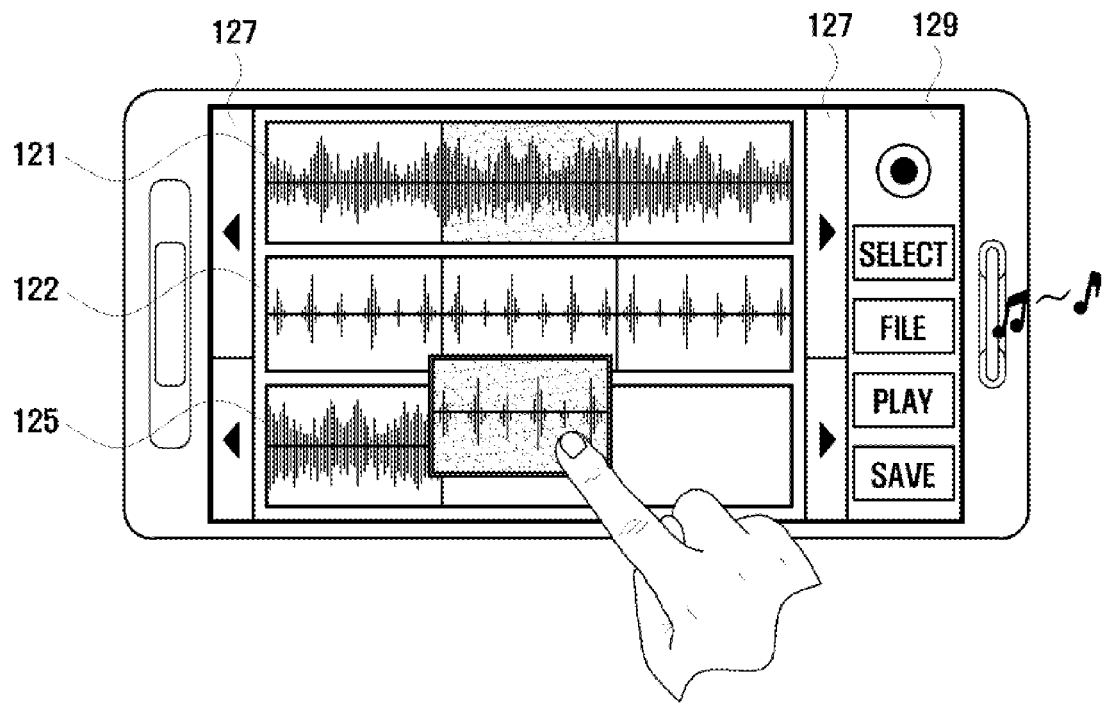
Figure 4E:
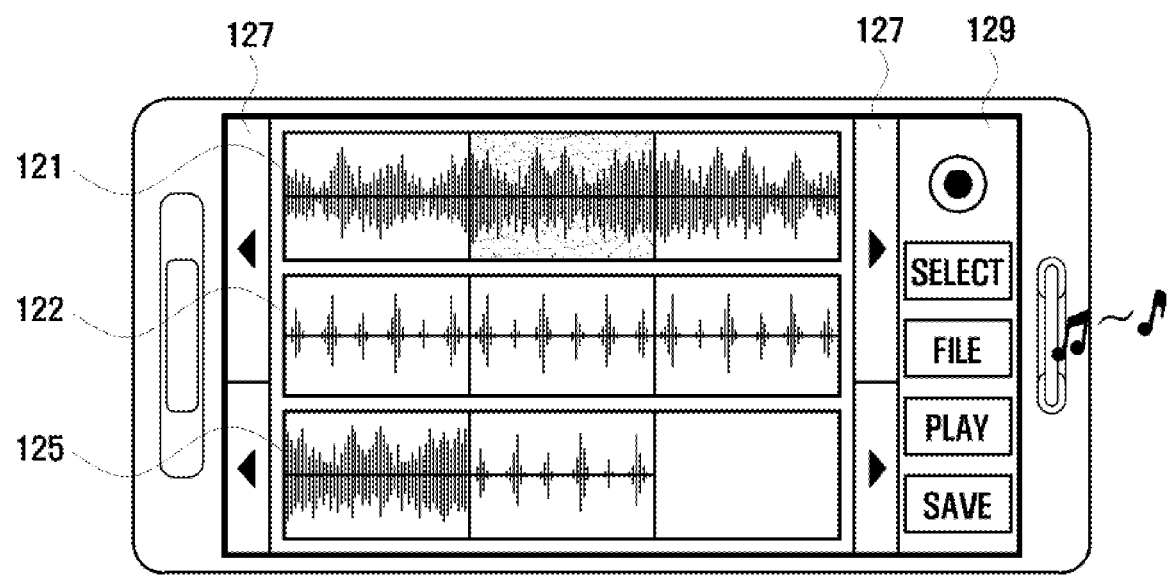

FIG. 4B shows that the user drags the first partial oscillation graph from the first oscillation window 121 and drops the first partial oscillation graph within the edit window 125. As shown in FIG. 4C, the user also can select a part of the second oscillation graph displayed in the second oscillation window 122 as a second partial oscillation graph. In that case, the user drags the second partial oscillation graph from the second oscillation window 122 and drops the second partial oscillation graph within the edit window 121 in the same manner as the first partial oscillation graph. In order for the user to select some parts of the oscillation graphs, the audio file edit application provides the "select" button which is activated by a touch. After the "select" button is activated, the user can select a part of the oscillation graphs displayed in the first and second oscillation window 121 and 122. While the first partial oscillation graph cropped from the first oscillation graph displayed in the first oscillation window is arranged at the beginning of the edit window 125, the second partial oscillation graph cropped from the second oscillation graph displayed in the second oscillation window is arranged right after the end point of the first partial oscillation graph within the edit window 125 as illustrated in FIG. 4D. As a consequence, the first partial oscillation graph and the second oscillation graph are aligned in series within the edit window 125 as illustrated in FIG. 4E.

In an exemplary embodiment of the present invention, the text corresponding to an audio file, which is displayed in the form of the oscillation graph within an oscillation window, is overlapped on the oscillation graph rather than displayed in a separate text window. Accordingly, when multiple oscillation windows are activated on the display unit 120, the control unit 160 of the mobile terminal controls such that the texts corresponding to the audio files displayed in the multiple oscillation windows are overlapped on the respective oscillation graphs. Also, when a specific duration of the oscillation graph is selected as a partial oscillation graph by a touch event, the control unit 160 determines that the text corresponding to the selected duration is selected together with the partial oscillation graph. Accordingly, when the partial oscillation graph is dragged and dropped within the edit window 125, the corresponding text moves together with the partial oscillation graph. In an exemplary embodiment of the present invention, the mobile terminal can be configured to display as many multiple text windows as the number of the oscillation windows. In an exemplary embodiment, the text windows are arranged below the corresponding oscillation windows.

As described above, the file edit function of the mobile terminal according to an exemplary embodiment of the present invention enables extracting audio data from multiple audio files while viewing corresponding texts of the lyrics of the audio files and combining the audio data into a single audio file.

Until now, the structures and functions of the mobile terminal and audio file edit application have been described. An audio file edit method for a mobile terminal is described hereinafter with reference to FIG. 5.

Figure 5:
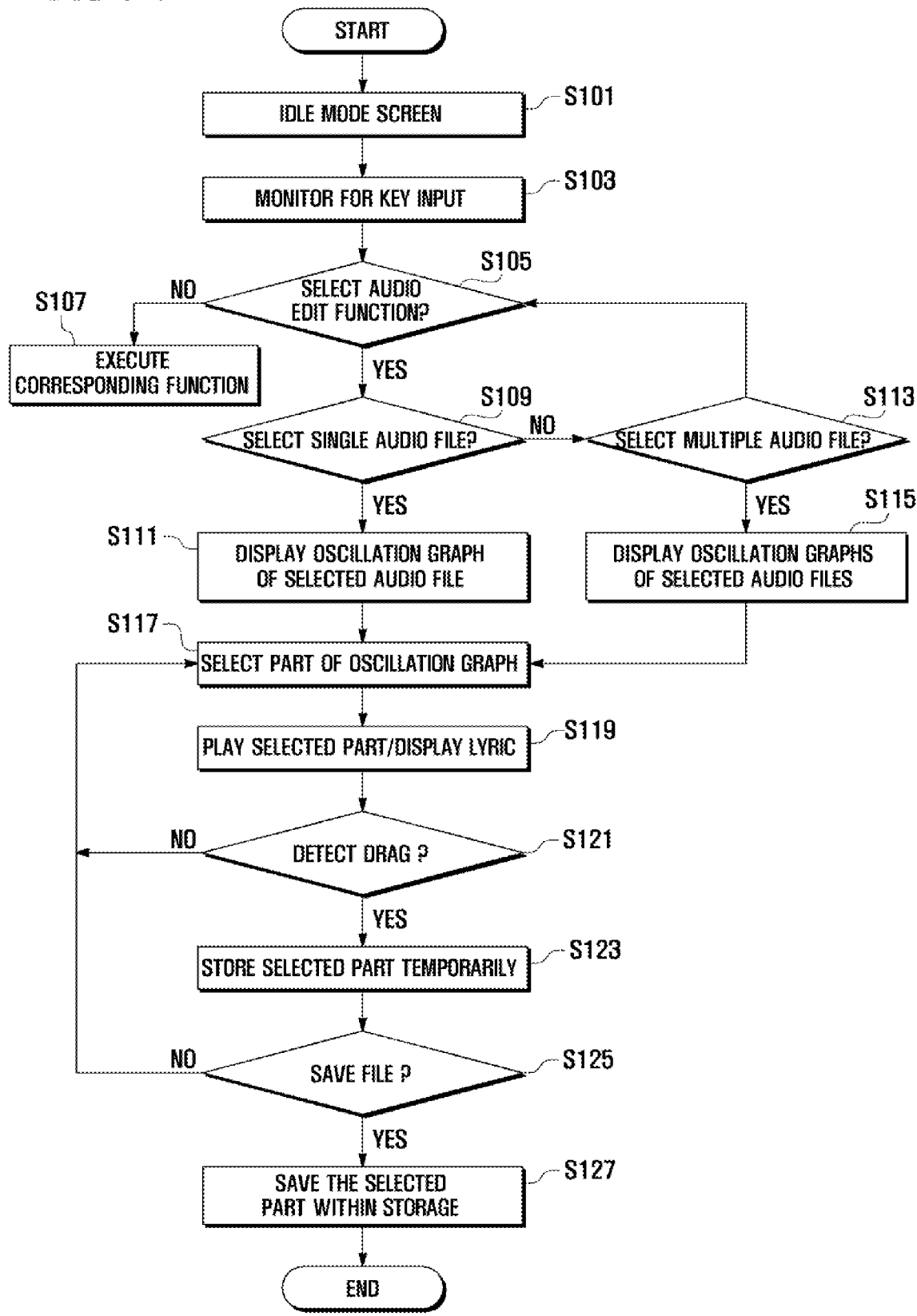
FIG. 5 is a flowchart illustrating an audio file edit method for a mobile terminal according to an exemplary embodiment of the present invention.

FIG. 5 is a flowchart illustrating an audio file edit method for a mobile terminal according to an exemplary embodiment of the present invention.

Referring to FIG. 5, once the mobile terminal powers on, the operating system stored in the storage unit 150 boots up and, in consequence, an idle mode screen is displayed on the display unit 120 in step S101.

Next, the control unit 160 of the mobile terminal monitors to detect a key input in step S103. Once a key input is detected, the control unit 160 determines whether the key input is an audio file edit request command in step S105. If the key input is not the audio file edit request command, the control unit 160 executes a function corresponding to the key input (such as voice call function, video call function, and camera function) in step S107.

On the other hand, if it is determined at step S105 that the key input is the audio file edit request command, then the control unit 160 executes the audio file edit application for editing audio files. With the execution of the audio file edit application, the control unit 160 controls the display unit 120 to display the audio file edit application screen.

After displaying the audio file edit application screen, the control unit 160 detects a key input and determines whether the key input is a single file selection command or a multiple files selection command in step S109. When the user touches the "file" button of the menu bar provided at a side of the audio file edit application screen, the control unit 160 controls such that a list of the audio files stored in the storage unit 150 is displayed on the display unit 120.

If an audio file is selected from the audio file list and then a selection complete command is input at step S109, the control unit 160 activates an oscillation window for the selected file in step S111. Otherwise, if no selection complete command is input after selecting the audio file, the control unit 160 determines whether another audio file is selected in step S113. That is, the control unit 160 determines whether multiple audio files are selected in step S113 and, if multiple audio files are selected, activates oscillation windows as many as the number of the selected audio files in step S115.

After activating the at least one oscillation windows, the control unit 160 selects a section on the at least one oscillation graph displayed in the corresponding oscillation window in response to a user command in step S117. In order to select a section, the user may touch the "select" button to activate the section selection function. Once the section selection function is activated, the user can set a section by touching a time point and sliding the touch to another time point or by touching two time points on the oscillation window.

Once a section is selected, the control unit 160 controls to play the selected section with the presentation of the corresponding text of the song lyric in step S119. In case that a lyric display function is supported, the control unit 160 displays the text window along with the corresponding oscillation window at steps S111 and S115. The control unit 160 can extract the text information (e.g. song lyric) from the corresponding audio file. If the audio file has no text information, the control unit 160 executes the speech recognition function to acquire the text information. At this time, the speech recognition function can be executed in the background processing mode. As aforementioned, the text information corresponding to the audio file can be overlapped on the oscillation graph of the audio file rather than displayed in a separate text window. At this time, the control unit 160 controls such that the text information and the oscillation graph of the audio file are displayed in synchronization with each other.

Next, the control unit 160 determines whether a drag signal for moving the selected section to the edit window 125 is detected in step S121. If no drag signal is detected, the process proceeds to step S117. If a drag signal for moving the selected section to the edit window 125 is detected, the control unit 160 stores the dragged section of the oscillation graph temporarily in step S123. At this time, the selected section can be stored together with the text information corresponding to the selected section. Also, the selected section of the oscillation graph and the corresponding part of the text information can be displayed simultaneously within the edit window 125.

In step S125, the control unit 160 determines whether a save command signal is input for saving the temporarily stored section of the audio file represented by the oscillation graph. If a save command signal is input, the control unit 160 saves the temporarily stored section of the audio file in the storage unit 150 in step S127. At this time, the selected section of the audio file can be saved in a ringtone file format and can be set as the ringtone of the mobile terminal.

If no save command signal is input, the process returns to step S117 such that the user can reselect a section of the audio file(s) displayed in the oscillation window(s) in the form of oscillation graph(s).

As aforementioned, the functions required at the respective steps are activated by touching the function buttons such as "file" button, "select" button, "save" button", and "play" button provided on the menu bar 129 of the audio file edit application screen. Although it is depicted that the above-functions are activated in series, the user can activate any of the functions by touching a corresponding function button whenever the function is required and available.

As described above, an exemplary audio file edit method and apparatus of the present invention enables cropping a part of the audio file while viewing a lyric text displayed in synchronization with the audio stream and temporarily storing the cropped part for editing. Also, an exemplary audio file edit method and apparatus of the present invention allows the user to create an audio file simply by cropping audio data from multiple audio files and aligning the cropped audio data in series within an edit window of an audio file edit application. An exemplary audio file edit method and apparatus of the present invention is advantageous to edit and process the files stored in a mobile terminal anytime and anywhere.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. An audio file edit method for a mobile terminal, the method comprising:
executing an audio file edit application;
selecting at least one audio file to be edited in response to a first touch event detected on the touch screen;
displaying an oscillation graph associated with the at least one audio file within an oscillation window of the audio file edit application;
selecting a part of the oscillation graph in response to a second touch event detected on the touch screen; and
displaying the selected part of the oscillation graph within an edit window of the audio file edit application.

2. The method of claim 1, further comprising displaying text information related to the audio file in synchronization with the oscillation graph.

3. The method of claim 2, wherein the displaying of text information comprises:
   extracting the text information from the audio file; and
   presenting the text information within a text window in synchronization with the oscillation graph.

4. The method of claim 2, wherein the displaying of text information comprises:
   playing the audio file at a portion corresponding to the oscillation graph displayed within the oscillation window;
   producing the text information by performing speech recognition while playing the audio file; and
   presenting the text information within a text window.

5. The method of claim 2, wherein the displaying of text information comprises presenting text information on the oscillation graph displayed within the oscillation window.

6. The method of claim 5, wherein the selecting of the part of the oscillation graph comprises selecting the text information corresponding to the selected part of the oscillation graph.

7. The method of claim 1, wherein the selecting of the part of the oscillation graph comprises defining the part of the oscillation graph by at least one of touching a start point on the oscillation graph and sliding the touch to an end point along a timeline, and touching a start point and an end point on the oscillation graph.

8. The method of claim 1, further comprising playing, when a part of the oscillation graph is selected, audio data of the audio file corresponding to the selected part of the oscillation graph.

9. The method of claim 1, wherein the displaying of the selected part of the oscillation graph within an edit window comprises:
   designating the selected part as a source audio data in response to a touch event; and
   displaying a visual effect of moving the source audio data from the oscillation window to the edit window in response to a drag event.

10. The method of claim 9, wherein the displaying of the selected part of the oscillation graph within an edit window further comprises displaying the text information corresponding to the selected part of the oscillation graph within the edit window.

11. The method of claim 1, further comprising:
    storing the selected part of the oscillation graph temporarily;
    saving the selected part as a ringtone file; and
    setting the ringtone file as a ringtone of the mobile terminal.

12. The method of claim 1, further comprising activating the oscillation window as many times as the number of the selected at least one audio file, when the at least one audio file to be edited is selected.

13. An audio file edit apparatus for a mobile terminal, the apparatus comprising:
    a display unit for displaying an audio file edit application screen;
    a storage unit for storing the audio file edit application and audio files;
    a touch screen for generating a a touch event input by a user; and
    a control unit for controlling the display unit to display an oscillation graph associated with an audio file which is selected in response to a first touch event, for selecting a part of the oscillation graph in response to a second touch event, and for displaying the selected part of the oscillation graph within an edit window of the audio file edit application.

14. The apparatus of claim 13, wherein the control unit controls text information corresponding to the oscillation graph.

15. The apparatus of claim 14, wherein the file edit application screen comprises:
    at least one oscillation window for displaying the oscillation graph;
    a text window for displaying the text information;
    an edit window for displaying the selected part of the oscillation graph;
    a menu bar having at least one of a "file" button for selecting the audio file, a "select" button" for selecting the part of the oscillation graph, a "play" button for playing the selected part of the oscillation graph, and a "save" button" for saving audio data corresponding to the selected part of the oscillation graph; and
    at least one navigation button for scrolling at least one of the oscillation graph which is displayed in the oscillation window, the text information which is displayed in the text window, and the selected part of the oscillation graph which is displayed within the edit window.

16. The apparatus of claim 15, wherein the edit window further displays the text information corresponding to the selected part of the oscillation graph.

17. The apparatus of claim 13, wherein the control unit acquires the text information by at least one of extracting from the audio file and performing speech recognition while playing the audio file and displays the text information on at least one of the oscillation graph and within a separate text window in synchronization with the oscillation graph.

18. The apparatus of claim 17, wherein the control unit selects the part of the oscillation graph together with the corresponding text information and displays the selected part of the oscillation graph within the edit window together with the corresponding text information.

19. The apparatus of claim 13, wherein the control unit controls, when a part of the oscillation graph is selected, to play audio data of the audio file corresponding to the selected part of the oscillation graph.

20. A non-transitory computer readable medium having embodied thereon instructions for an audio file edit method for a mobile terminal, the method comprising:
    executing an audio file edit application;
    selecting at least one audio file to be edited in response to a first touch event;
    displaying an oscillation graph associated with the at least one audio file within an oscillation window of the audio file edit application;
    selecting a part of the oscillation graph in response to a second touch event detected on the touch screen; and
    displaying the selected part of the oscillation graph within an edit window of the audio file edit application.

* * * * *